J. M. WITMER.
Carriage-Axle Lubricator.
No. 162,209. Patented April 20, 1875.
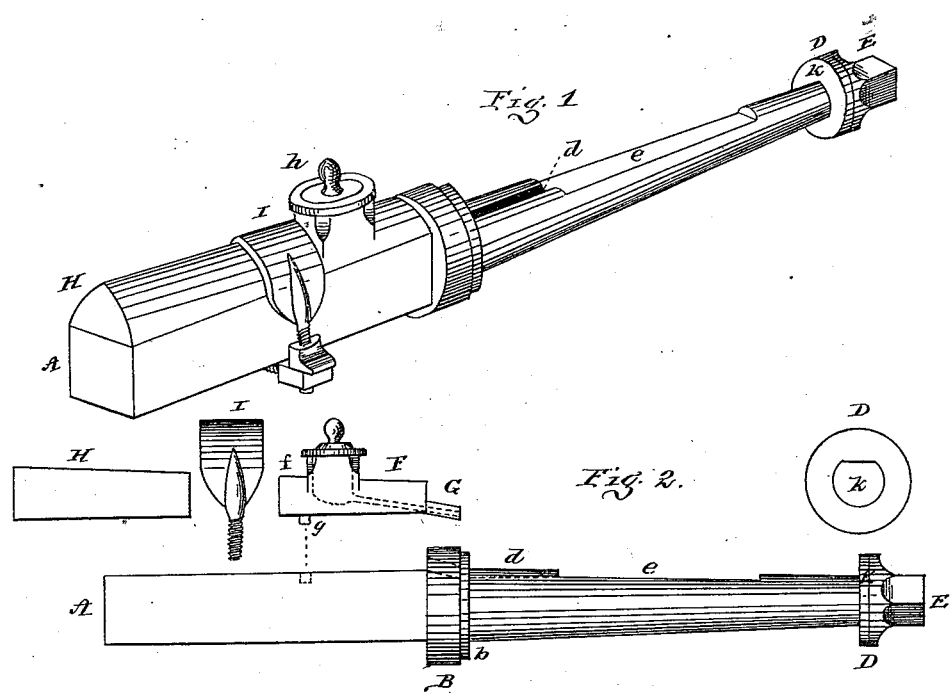
WITNESSES·
INVENTOR·

UNITED STATES PATENT OFFICE.

JOHN M. WITMER, OF MANOR TOWNSHIP, LANCASTER COUNTY, PA.

IMPROVEMENT IN CARRIAGE-AXLE LUBRICATORS.

Specification forming part of Letters Patent No. 162,209, dated April 20, 1875; application filed February 16, 1875.

*To all whom it may concern:*

Be it known that I, JOHN M. WITMER, of Manor township, in the county of Lancaster and State of Pennsylvania, have invented certain Improvements in Lubricating Device for Axles on Vehicles, of which the following is a specification:

The nature of my invention consists in the construction and mode of application of a self-acting lubricating-cup to the axles of vehicles.

The accompanying drawing, with letters of reference marked thereon, and a brief explanation, will enable those skilled in the art to make and apply said invention, in which—

Figure 1 is a perspective view of a portion of the axle and spindle with my improvements in place. Fig. 2 shows the same with the parts detached.

A represents the shank or square portion of an iron axle as in common use, whether a cast-metal sleeve is used on a wooden axletree, or, as shown, simply covered with a wooden bar, H. The collar B on the spindle is perforated on the upper side, and a groove, $d$, made in the spindle outside the collar, into which the perforation opens. A portion, $e$, of the upper face of the spindle is flattened to receive the oil fed through the groove, and aids in partially retaining and distributing the lubricating ingredient. The oil-cup F opens through a spout, G, made to enter into or through the aforesaid opening or perforation in the collar B, with its groove in the spindle, and plain face aforesaid. The oil-cup or lubricating-vessel F has a flange or abutment, $f$, adapted to the shape of the wooden bar H, which abuts closely against it, so that when the spout G is inserted into the collar the other end is secured, by means of an ordinary clip, I, over the abutting union of the bar H and oil-cup portion $f$, which firmly combines the cup with the axle. The top of the cup is provided with a hinged or screw top or lid, $h$. This may be faced with a gum washer, to prevent leaking and dirt from entering the same.

I am aware that cups or reservoirs for oil closed by a screw-plug, which is turned to force the oil through a duct leading to a groove in the upper part of the spindle, have been used. I am also aware that lubricating-cups having a perforated screw-stem penetrating through a clip and top rail combined, as in Patent No. 102,408, April 26, 1870, have been used. Such I do not claim.

I am not aware of a lubricating-cup having conically-rounded flanges extending on two opposite sides, so as to produce an elongated flat base, by which it sets directly upon the upper face of the axle bar without screw attachment, (so troublesome to cut,) and one end held jointly with the abutting top rail by an ordinary clip, and the other at its lower end provided with a perforated tube, which is inserted through the collar to secure it.

These cups may be made of malleable iron or other material, ready for application, in the manner specified, and thus constitute a new article of manufacture for the trade. I have also introduced a new mode for preventing the nut E on the end of the spindle from getting loose, as happens by allowing the washer to revolve when backing the vehicle. By filing a flat segment on the top of the spindle at K, and forming a portion of the inner circumference of the washer D straight, to set over the flat space K, so as to prevent its motion, the tendency of loosing the nuts is greatly if not wholly diminished. I mention this because I believe such a washer on vehicles has never been used heretofore, yet I am aware such washers are common in stop-cocks and gas-fittings; hence, I do no more than mention it as an improvement in spindles for vehicles, and, while I make no special claim, it adds greatly to my improvement on spindles, in combination with my lubricating device.

What I claim as my invention is—

The lubricating-cup F, having the abutting side flanges, which gives the device an extended flat base, to set directly upon the axle-bar A, to which it is secured on one of its projecting flanges, $f$, by an ordinary clip, I, the other end by inserting the tube G through the collar B, all constructed and combined substantially as and for the purpose set forth.

JOHN M. WITMER.

Witnesses:
  W. B. WILEY,
  JACOB STAUFFER.